Sept. 14, 1926.

P. W. SHIELDS 1,599,497

MACHINE FOR FILLING AND CAPPING BOTTLES

Filed March 15, 1918     13 Sheets-Sheet 1

WITNESSES

INVENTOR
P. W. Shields

Sept. 14, 1926.

P. W. SHIELDS 1,599,497

MACHINE FOR FILLING AND CAPPING BOTTLES

Filed March 15, 1918    13 Sheets-Sheet 5

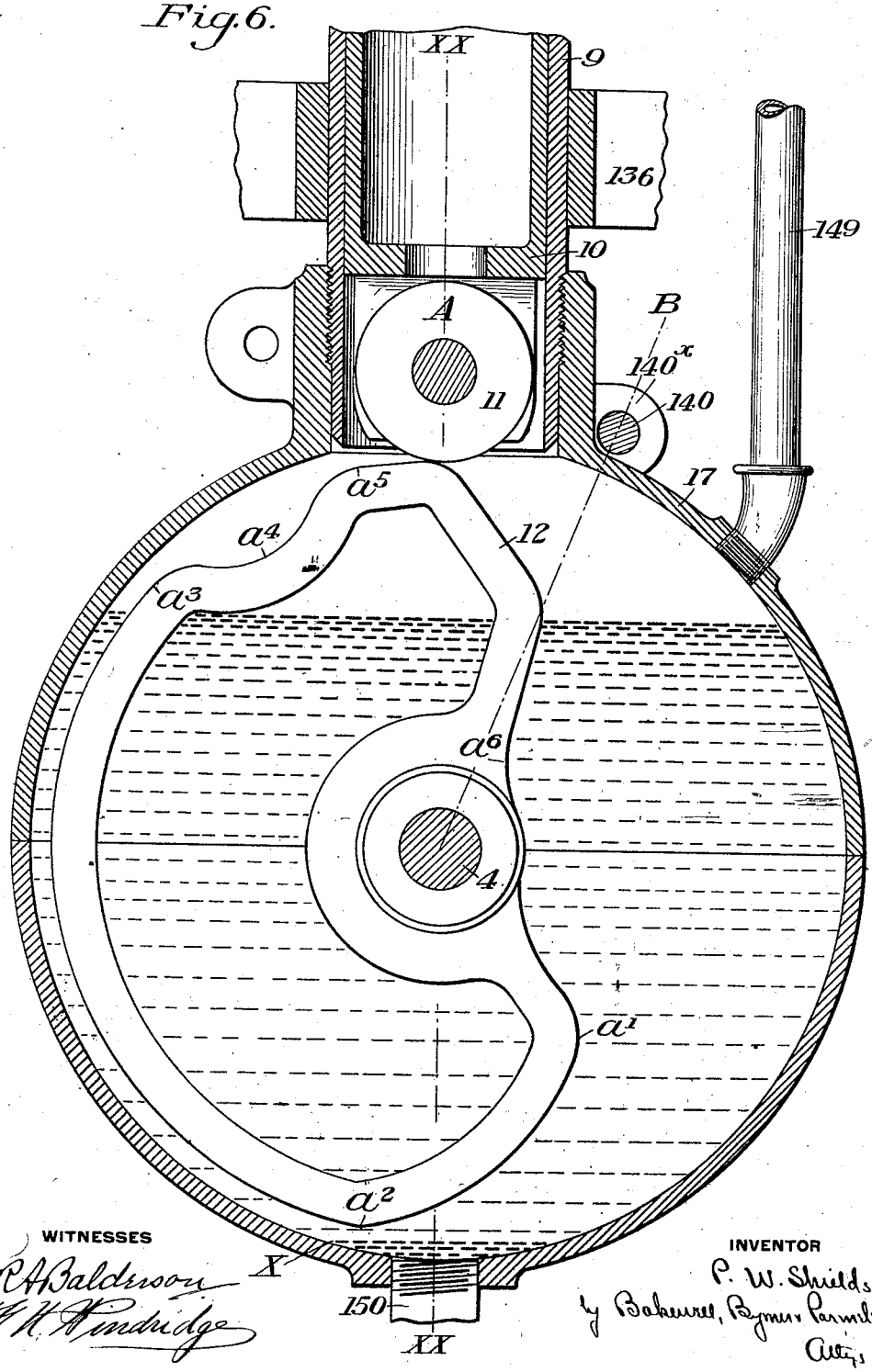

Sept. 14, 1926.  
P. W. SHIELDS  
1,599,497  
MACHINE FOR FILLING AND CAPPING BOTTLES  
Filed March 15, 1918  13 Sheets-Sheet 7
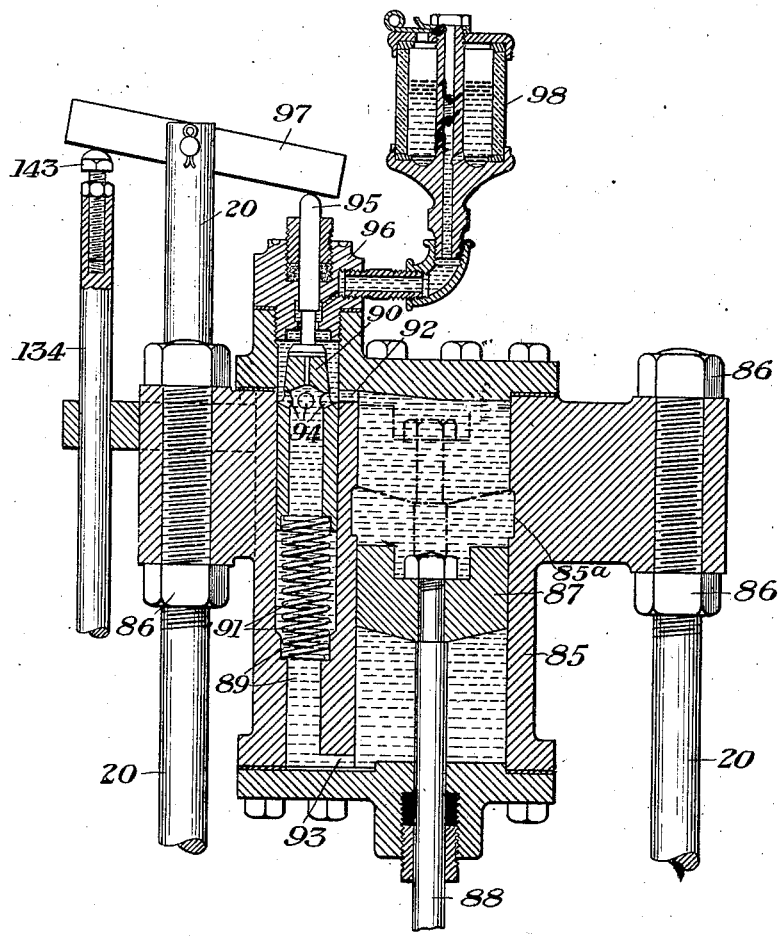
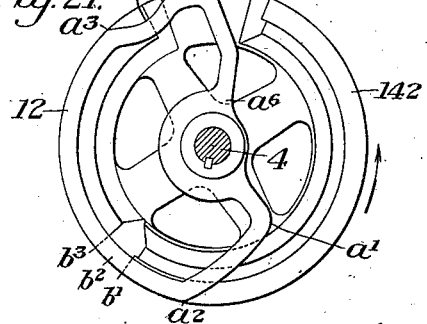
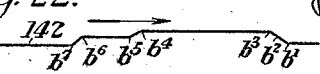

Sept. 14, 1926.

P. W. SHIELDS 1,599,497

MACHINE FOR FILLING AND CAPPING BOTTLES

Filed March 15, 1918 13 Sheets-Sheet 8

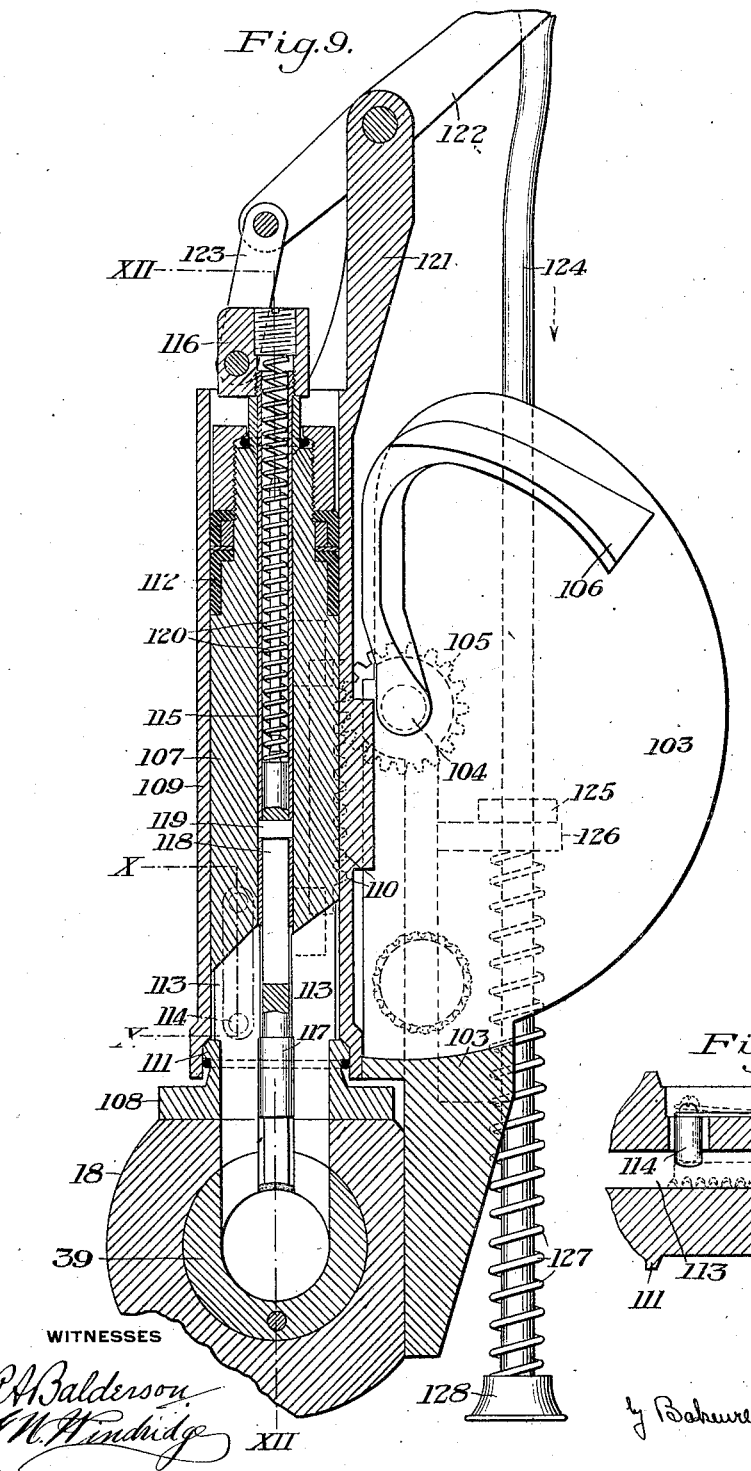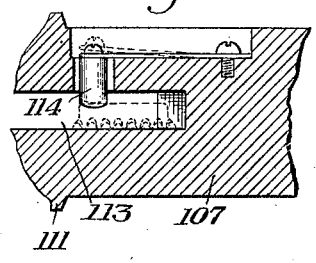

Sept. 14, 1926.
P. W. SHIELDS
1,599,497
MACHINE FOR FILLING AND CAPPING BOTTLES
Filed March 15, 1918     13 Sheets-Sheet 10
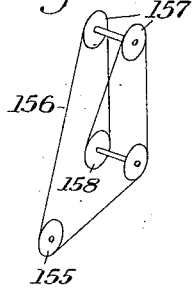
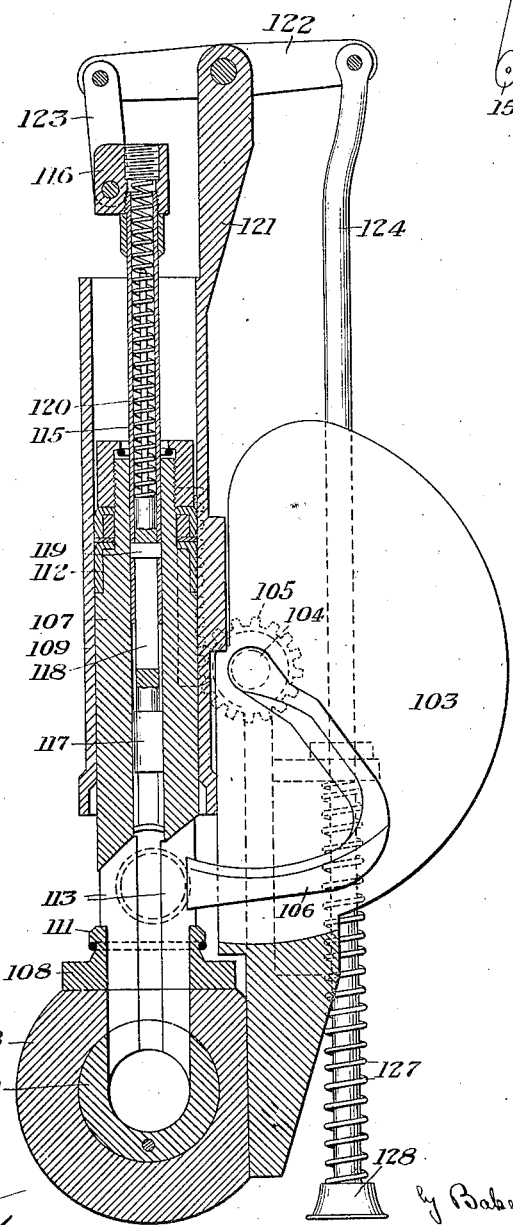

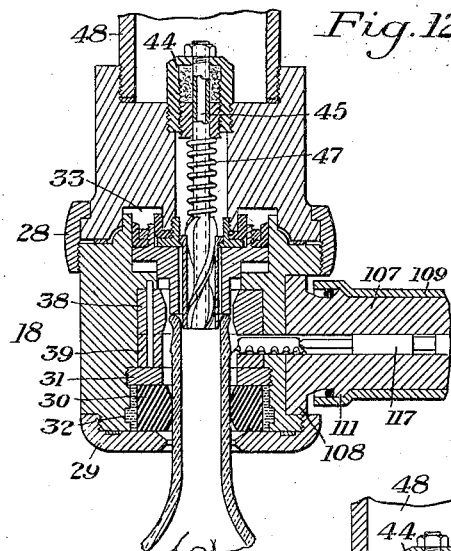
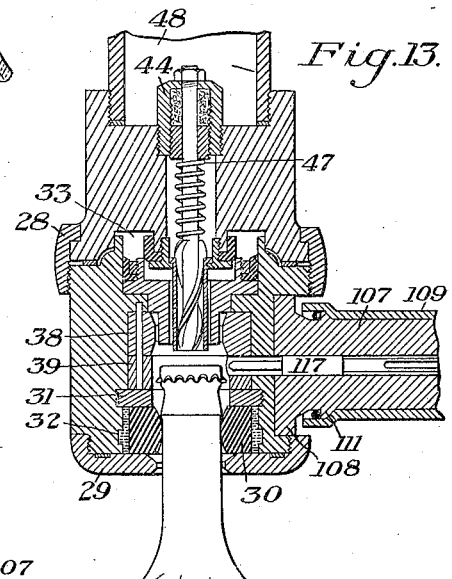
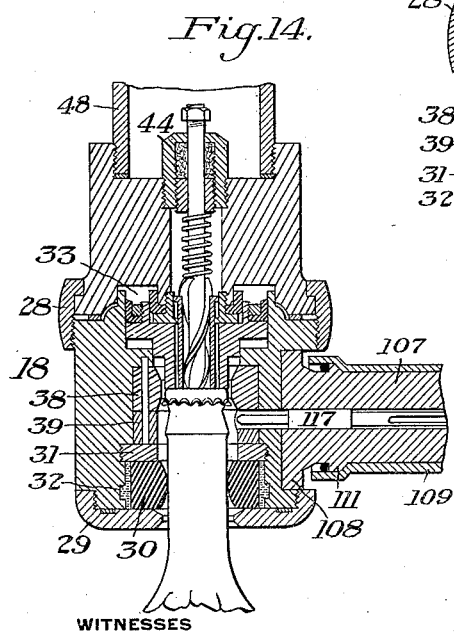

Sept. 14, 1926.                                                     1,599,497
P. W. SHIELDS
MACHINE FOR FILLING AND CAPPING BOTTLES
Filed March 15, 1918    13 Sheets-Sheet 12
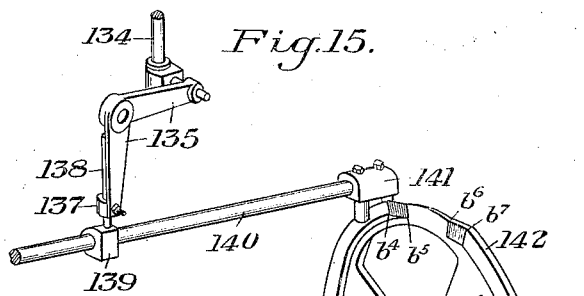
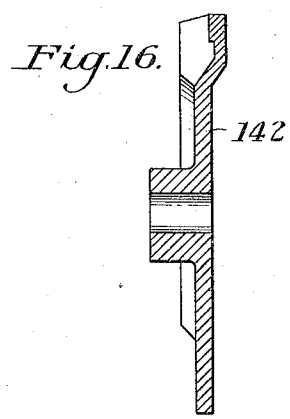
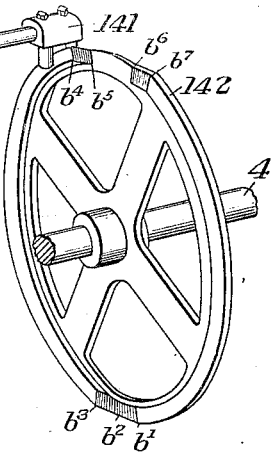
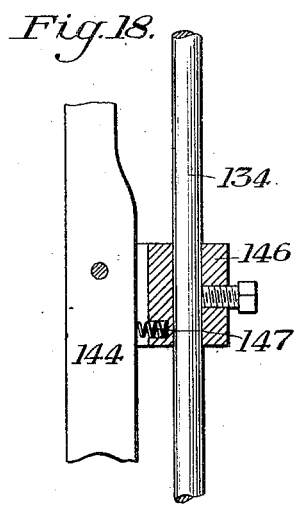
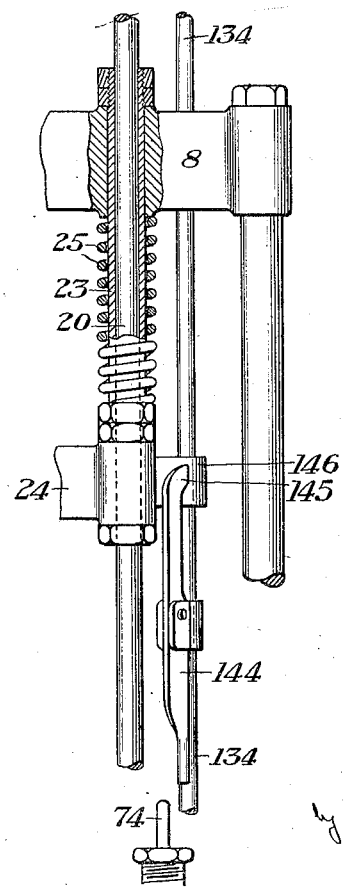
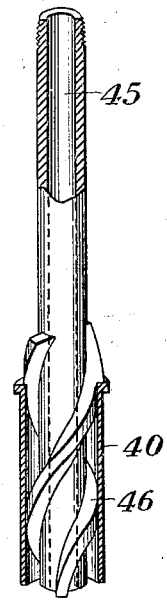
WITNESSES
R. A. Balderson
H. W. Windridge
INVENTOR
P. W. Shields

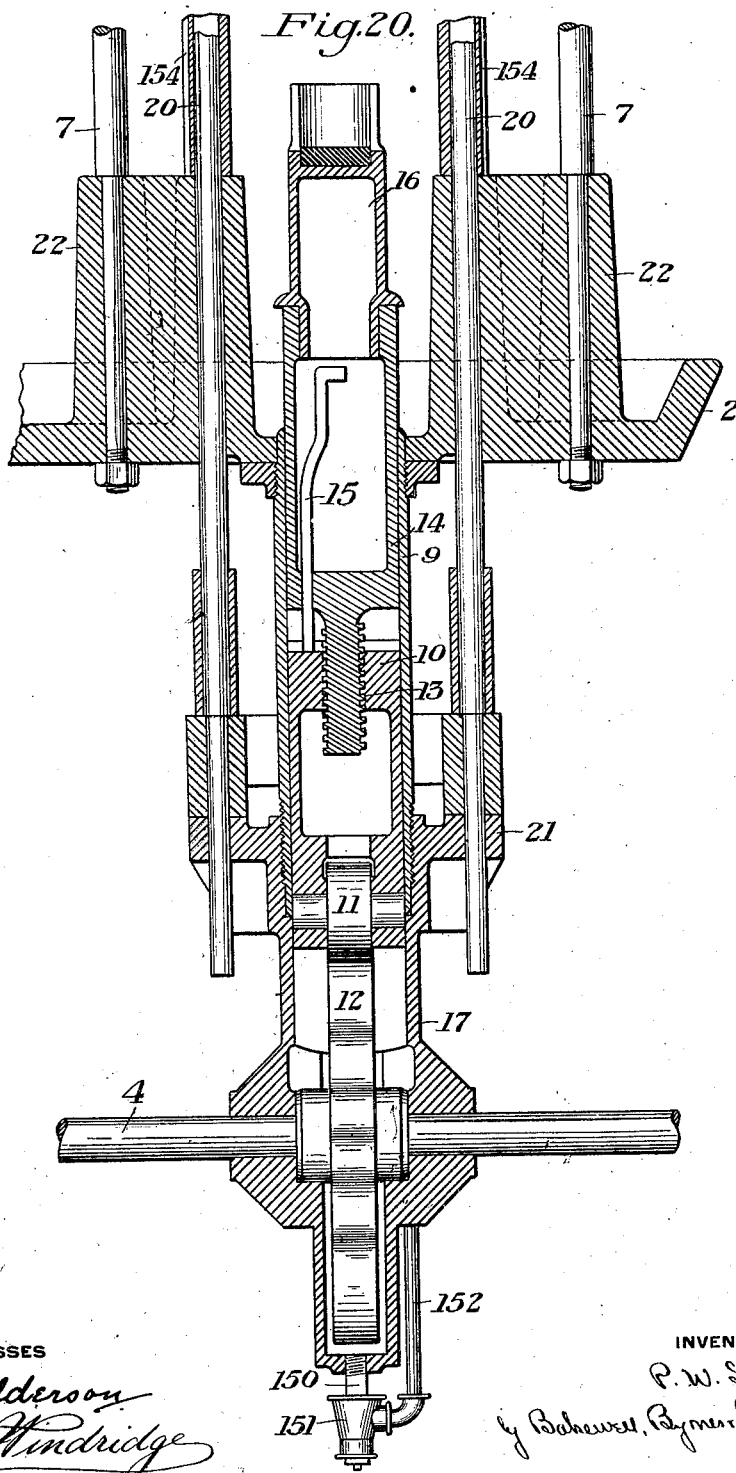

Patented Sept. 14, 1926.

1,599,497

UNITED STATES PATENT OFFICE.

PATRICK W. SHIELDS, OF PITTSBURGH, PENNSYLVANIA, ASSIGNOR TO McKENNA BRASS AND MANUFACTURING COMPANY, OF PITTSBURGH, PENNSYLVANIA, A CORPORATION OF PENNSYLVANIA.

MACHINE FOR FILLING AND CAPPING BOTTLES.

Application filed March 15, 1918. Serial No. 222,573.

Figure 6 is a detail sectional view on the line VI—VI of Figure 3.

Figure 7 is a similar view on the line VII—VII of Figure 4.

Figure 9 is still another detail sectional view on the line IX—IX of Figure 8.

Figure 10 is a detail sectional view on the line X—X of Figure 9.

Figure 11 is a view similar to Figure 9 showing the mechanism in the reverse position from that shown in Figure 9.

Figure 12 is a sectional view on the line XII—XII of Figure 9, and which is similar to Figure 8, showing the bottle in the position it occupies when it is being filled.

Figure 13 is a view similar to Figure 12 with the bottle in its lowered position and a crown moved into position over the mouth of the bottle.

Figure 14 is still another view similar to Figure 12 showing the bottle in the position it occupies when the crown has been applied.

Figure 15 is a detail perspective view of the mechanism for operating the valve rod.

Figure 16 is a sectional view of the valve operating cam.

Figure 17 is a detail sectional view showing the operating mechanism for the water valve.

Figure 18 is a detail sectional view showing the water valve operating lever and the spring therefor.

Figure 19 is a perspective view partially in section showing the water feed tube and the air exhaust tube for the bottle.

Figure 20 is a detail sectional view on the line XX—XX of Figure 6, but illustrating more of the plunger for elevating the bottle.

Figure 21 is a side elevation showing the relation of the bottle operating cam and the valve operating cam.

Figure 22 is a development of the valve operating cam, and

Figure 23 is a diagram illustrating the shield operating mechanism.

Figure 1:
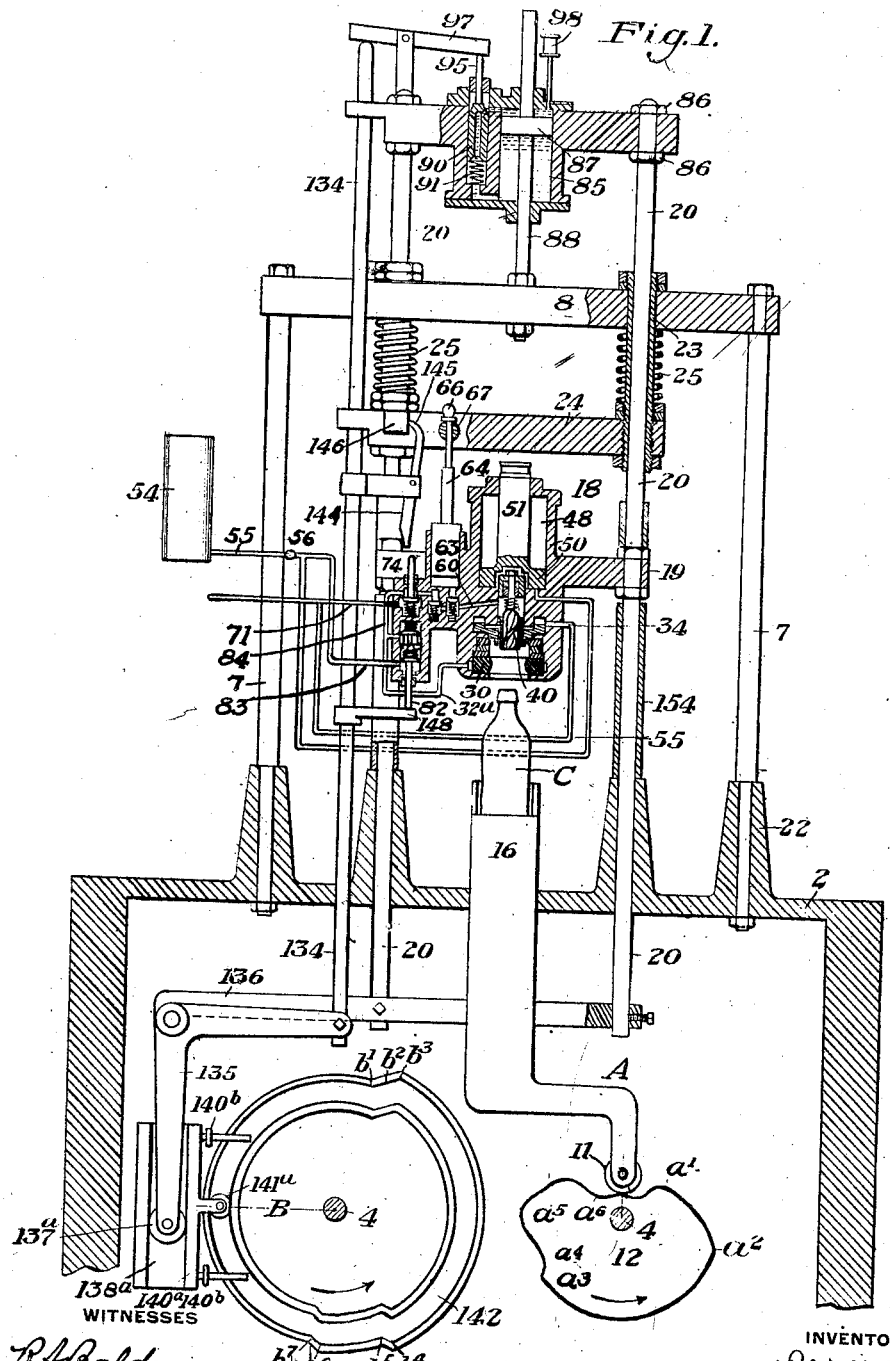
Figure 1 is a diagram partially in section illustrating in a general way the various parts of the machine.
Figure 2:
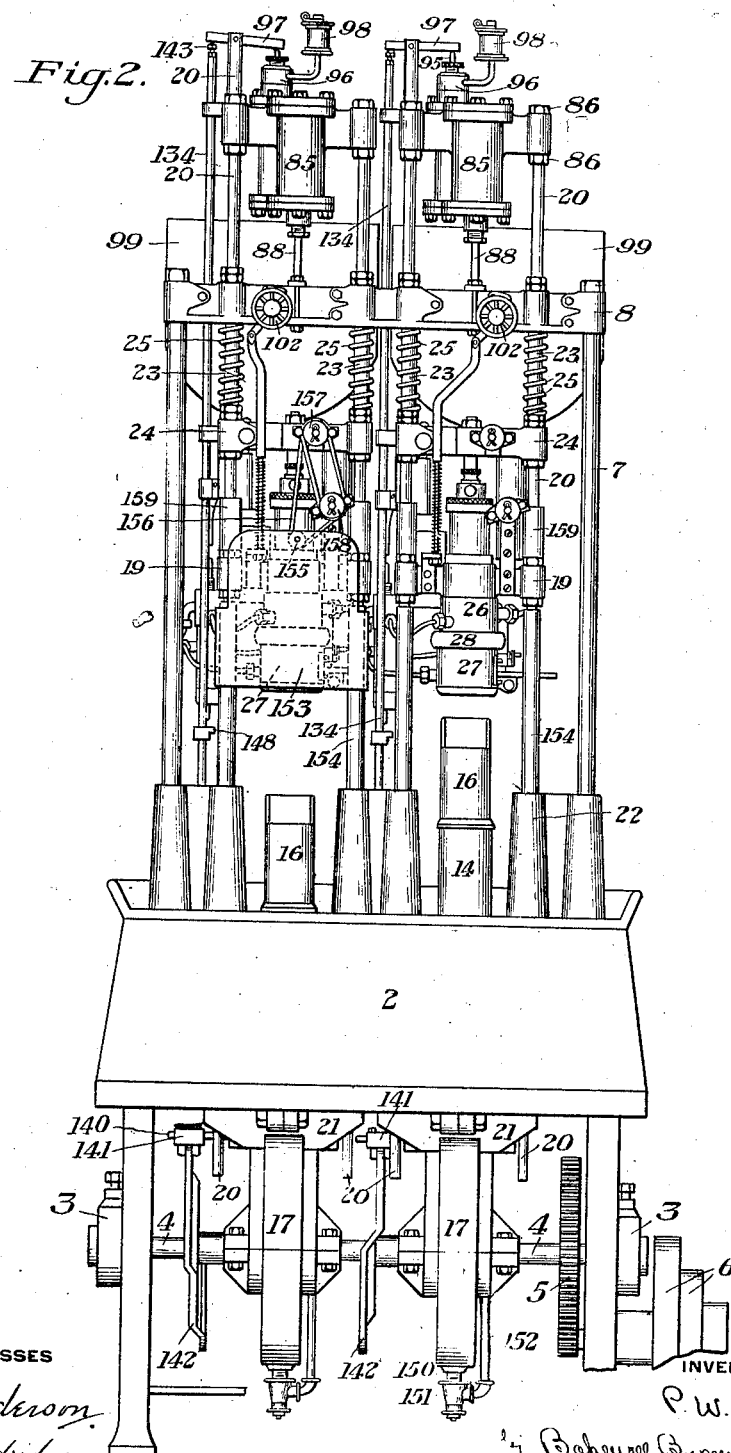
Figure 2 is a front view of the machine.

My invention has relation to machines for filling bottles with aerated or carbonated waters either with or without the desired proportion of syrup, and for closing them with a metallic stopper when filled. The object of my invention is to provide a machine of this character which is simple in its construction and mode of operation, and by means of which bottles may be rapidly filled and capped. A further and more specific object of my invention is to provide a machine of this nature having improved operative mechanism for the various parts; also to improve the construction and arrangement of the filling head; and cap fitting mechanism.

Another object of my invention is to provide a machine which is adapted to alternately operate on two bottles and in which the mechanisms for each bottle are set at approximately 180° from each other, so that when one set of mechanism is filling a bottle, the filled bottle can be withdrawn from the other mechanism and a new bottle inserted in place thereof.

A still further object of my invention is to provide mechanism in which the filling head, together with the valves for controlling the feed of the syrup and water, remain stationary unless a bottle is placed in the machine.

A still further object of my invention is to provide a positive lock for the head to lock the mechanism in the position shifted by the bottle when moved into filling position, in order to retain the mechanism in this position during the capping of the bottle, so as to provide means for taking care of bottles of various heights.

A still further object of my invention is to provide valve actuating mechanism which is positively operated by a cam and which is thrown into operative position by means of the bottle. Other novel features and objects of my invention will be hereinafter pointed out.

As before stated, the machine comprises duplicate sets of operating mechanisms, and for the sake of clearness only the one set will be described and the same reference characters applied to the other set.

The machine generally comprises a supporting table and a plurality of guide rods connected to each other at their upper ends by means of a cross head, and slidably mounted within bearings or guides in the cross head and table are rods for supporting the head, valves, locking mechanism, and filling mechanism. The bottle is moved into filling relation with the head by means of a plunger which is reciprocated by means of a cam, the valves are operated by means of tappets connected to a sliding valve rod which is carried by the head supporting rods so as to be shifted with the head when the head is moved by means of the bottle. This valve rod is also arranged to be moved with relation to the filling head by means of a cam carried on the same shaft which carries the bottle plunger actuating cam, and said cams are in timed relation to each other so as to operate the valve rod at predetermined intervals to actuate the valves.

The precise nature of my invention will be best understood by reference to the accompanying drawings in which I have shown the preferred form thereof, and which will now be described, it being premised, however, that various changes may be made in the details of construction and arrangement of the various parts without departing from the spirit and scope of my invention as defined in the appended claims.

Referring to the accompanying drawings the reference character 2 designates the table and supporting frame which is provided with bearings 3 for a cam shaft 4. This cam shaft 4 is arranged to be actuated by gearing 5 which is operated by a stepped pulley 6.

Fixedly connected to the table 2 are rods 7 and connected to the upper ends of these rods is a cross bar 8, the rods together with the cross bar forming a part of the frame of the machine.

Connected to the table 2 and extending downwardly therefrom is a sleeve 9 which forms a guide for the bottle raising plunger, and which plunger comprises a member 10 having a roller 11 journaled in the lower end thereof. This roller is actuated by means of a cam 12 connected to the shaft 4 to raise and lower the bottle plunger as hereinafter described. Adjustably connected to the plunger member 10 by means of a threaded engagement 13 is a second member 14, which is held in its adjusted position by means of a locking pin 15 which engages an orifice in the member 10 and a slot in the member 14. Removably mounted on the upper end of the plunger member 14 is a bottle support 16. This support is made removable so that supports of different heights can be used for taking care of bottles of different capacities.

Connected to the lower end of the sleeve 9 is a casing 17 for the cam 12, and which is arranged to be partially filled with oil to lubricate the cam, and is also provided with overflows as hereinafter described, to take care of any leakage which passes down into the casing between the plunger and the sleeve.

18 is the filling head which is connected to a cross head 19 which is in turn connected to guide rods 20. These guide rods 20 are slidably mounted in extensions 21 on the cam casing 17, projections 22 on the table 2, and sleeves 23 slidably mounted in the cross bar 8. These sleeves 23 are connected to a second cross head 24 and which is arranged to be slightly moved with relation to the guide rods 20, and which is held in its lowered position by springs 25, for the purpose hereinafter described.

*Filling head and connections.*

The filling head 18 comprises an upper member 26 and a lower member 27, which are secured to each other by means of a threaded ring 28. Mounted in the lower member 27 and held in position therein by means of a nut 29 is a packing ring 30 which is confined between the nut 29 and an externally threaded disk 31, which is provided with a central orifice through which the neck of the bottle can freely pass. 32 is an annular chamber surrounding the exterior of the packing ring 30 which communicates with a port 31ª, and which port in turn communicates with a pressure pipe 32ª. This pressure pipe 32ª is opened to pressure and exhaust at predetermined intervals in order to clamp the packing ring 31 about the neck of the bottle during the filling and capping operation and to exhaust the pressure after the bottle has been capped in order to permit the bottle and cap to be lowered therethrough.

33 is a pressure chamber between the upper and lower members 26 and 27 of the filling head, and which is provided with a port 34 which is always in communication with the main supply of a carbonated water as hereinafter described. Slidably mounted within this chamber 33 is a piston 35 having a packing ring 36 to prevent leakage from the top of the pressure chamber to the bottom thereof around the piston. This piston is also provided with a downwardly extending hollow stem 37 which is arranged to be engaged by the mouth of the bottle when the bottle is forced into the filling head, as clearly shown in Figure 12. Mounted within the lower member 27 of the filling head is a crowing die 38 and a ring 39 having a cutaway portion through which the crowns are fed into the filling head. Secured to a central projection on the upper portion of the filing head 26 is a filling tube 40 which extends downwardly through an opening in the piston 35 to a point slightly below the lower end of the hollow stem thereon, and 41 is a second packing ring in engagement with the interior or hollow portion of the piston 35 to prevent leakage of pressure from the chamber 33 through the hollow or interior of the piston. The upper member 26 of the filling head is provided with a second chamber 42, through which the syrup and aerated water are fed to the filling tube 40.

Figure 8:
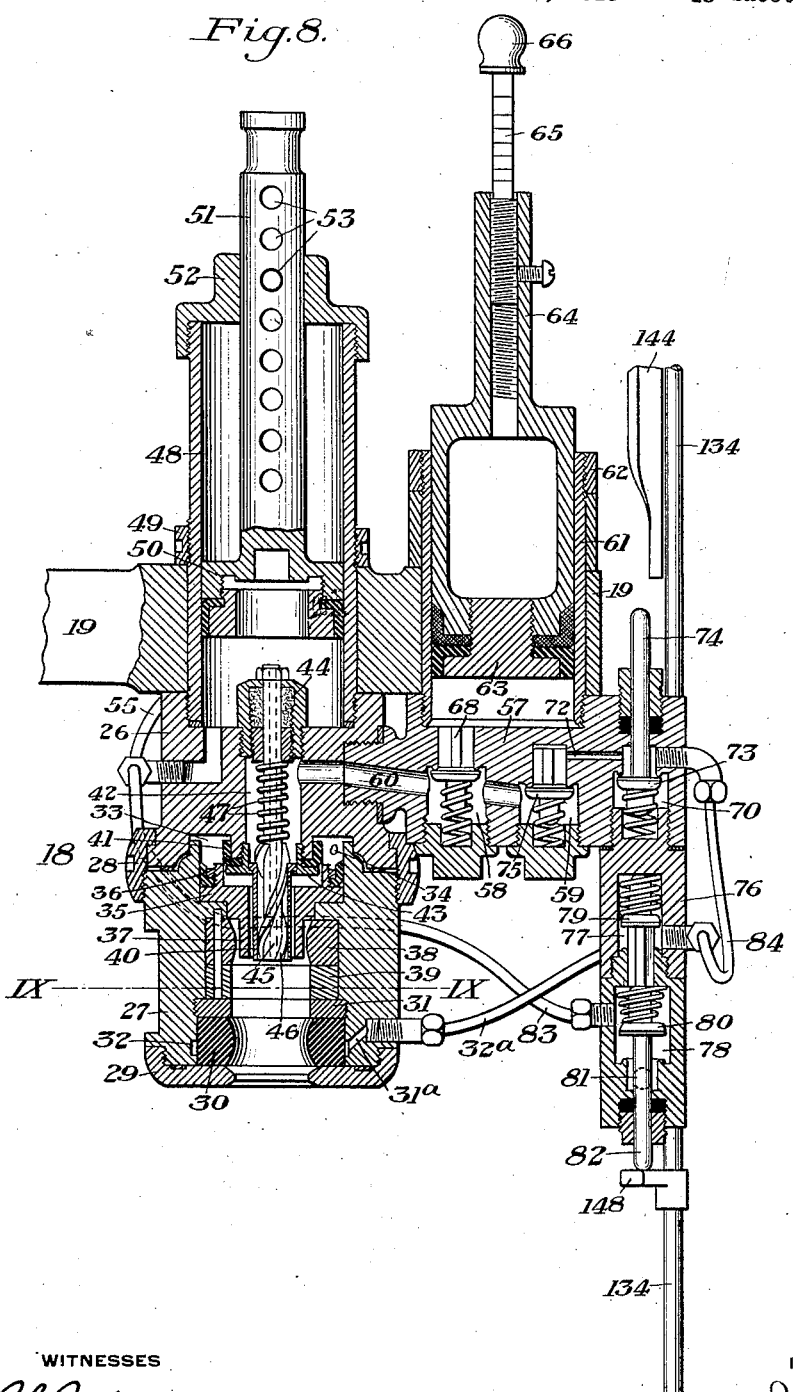
Figure 8 is another detail sectional view on the line VIII—VIII of Figure 5.

The filling tube 40 is slidably mounted in a nut 43 which retains the second packing ring 41 in position. The filling tube 40 is provided with a flange on its upper end which is arranged to seat on an annular flange on the nut 43. Mounted within the filling tube 40 and extending upwardly through the chamber 42 and a stuffing box 44, which forms the upper end of the chamber 42, is an air escape tube 45. This tube is provided with a plurality of helical ribs 46 within the filling tube 40, and are arranged to give the fluid a swirly motion while entering the bottle to form a vortex through which the air passes when leaving the bottle and which air passes upwardly through the escape tube 45. The lower portions of the helical ribs 46 are somewhat smaller than the upper portions thereof, there being shoulders formed at the junctions which engage the upper end of the filling tube to hold it in contact with the nut 43 through the medium of a spring 47, surrounding the air escape tube. This spring engages the stuffing box and the upper ends of the helical ribs in order to maintain the parts in the position shown in Figures 8 and 12 during the filling operation and to exert pressure on the crown during the crowning operation.

Figure 3:
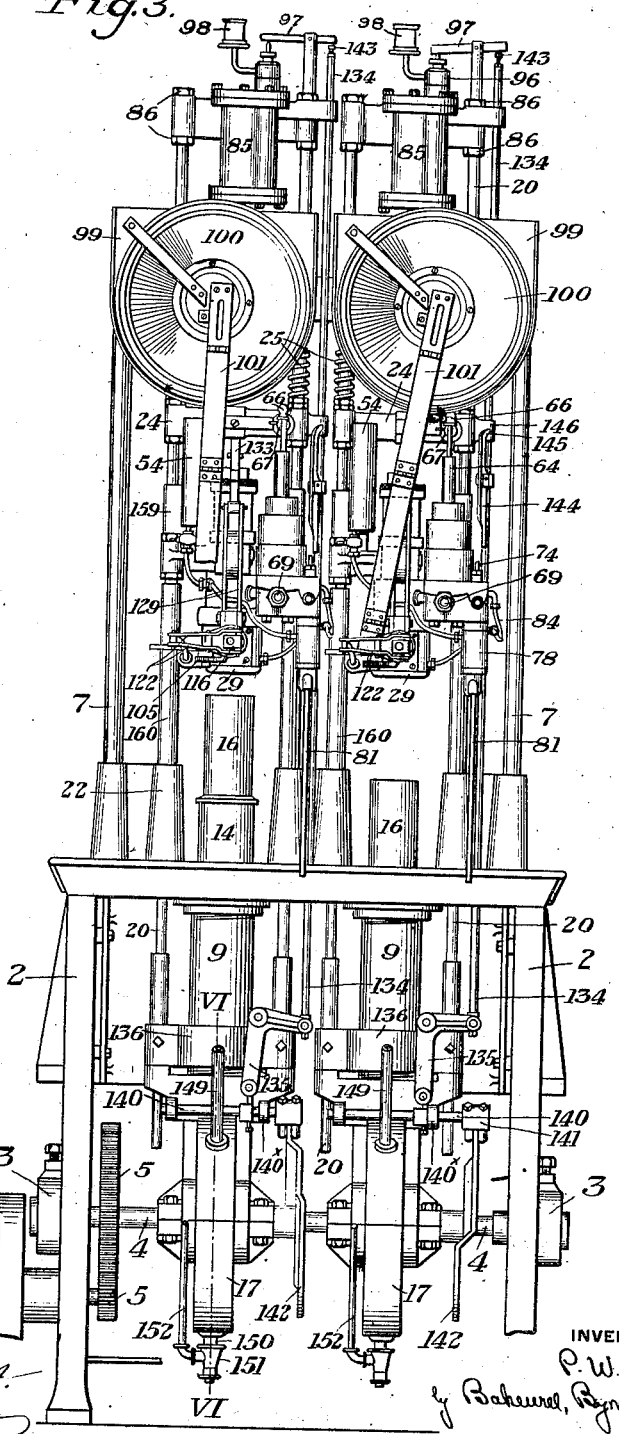
Figure 3 is a rear view.

The filling head is partially secured to the cross head 19 by means of a cylinder 48 which passes through an opening in the cross head and has a screw-threaded engagement with the upper member 26 of the filling head. This cylinder 48 is held in position on the cross head by means of a nut 49 which has a screw-threaded engagement with the outer wall of the cylinder. Adjustably mounted within the cylinder 48 is a piston 50 having a piston rod 51 which extends through a cylinder head 52 and which rod is held in its adjusted position by means of a pin which extends through openings in the head 52 and one of a series of openings 53 in the piston rod. The piston 50 is provided with a packing ring in order to form a tight chamber below the piston, which chamber is in communication with the opening in the air escape tube and is arranged to receive the air passing from the bottle during the filling operation, and as soon as the air pressure in said chamber is equal to the pressure of the water supply as hereinafter described, the feeding of the water will be stopped. By providing an adjustable air chamber such as above described, adjustment can be made for varying pressures and also for varying capacities of bottles. In order to provide means for filling quart as well as pint bottles, I provide an auxiliary air chamber 54, clearly shown in Figures 1 and 3, and which auxiliary chamber is connected by means of a tube 55 with the adjustable chamber below the piston 50. 56 is a stop cock in the connection between the main air chamber and the auxiliary chamber which is closed when filling bottles of approximately the one pint size. (See Figure 1). 57 designates a valve casing which is connected to the upper member 26 of the filling head, and which is provided with connected chambers 58 and 59, the chamber 58 being connected with the chamber 42 in the filling head by means of a port 60. This valve casing 57 is held in position on the cross head by means of a cylinder 61 of the syrup pump, which extends through an opening in the cross head 19 and has a screw-threaded connection with the valve casing. The upper end of this cylinder is secured to the cross head by means of a nut 62 and a sleeve interposed between the nut and the cross head. 63 is the piston of the syrup pump having an upwardly extending hollow stem 64 and 65 is a graduated rod having a screw-threaded connection with the stem 64. This rod 65 is provided with a head 66 which is arranged to be engaged by a slotted pin 67 in the cross head 24 to move the piston in one direction to supply syrup to the cylinder, and to move the piston in the other direction when the pin 67 engages the top of the stem 64 to force the syrup into the bottle through the port 60 and a port controlled by a check valve 68 in the chamber 58. The syrup is fed to the cylinder of the syrup pump through a check control pipe 69 leading in from the rear of the machine, so that when the piston is moved upwardly with relation to the cylinder, syrup will be drawn into the pump, and when moved downwardly will be discharged into the bottle through the passage or port 60.

The valve casing 57 is provided with a water chamber 70 which is in communication with a water inlet pipe 71. This chamber 70 is in communication with the chamber 59 by means of a port 72, and 73 is a valve for permitting the water to pass from the chamber 70 to the port 72. This valve 73 is held in its upward position by means of a spring and is also provided with an upwardly extending stem 74 which passes through a stuffing box in the valve casing. The port 72 is not in direct communication with the chamber 59, but is shut off therefrom by means of a spring controlled check valve 75 which will prevent the syrup from backing up into the port 72. 76 is an auxiliary valve casing which closes the end of the chamber 70, having chambers 77 and 78 therein. 79 is a spring pressed valve in the chamber 77, which when moved upwardly is arranged to open communication between the chambers 77 and 78, and 80 is a valve in the chamber 78 arranged to open said chamber to the exhaust port 81 when the stem 82 of the valve 80 is engaged as hereinafter described. This last mentioned valve 80 is held in its closed position by means of a spring; this valve is also provided with an upwardly extending stem arranged to engage the guides on the valve 79 to move it to its open position when the valve 80 is opened. The chamber 78 is in communication with the air chamber in the cylinder 48 by means of a tube 83, while the chamber 77 is in communication with the pipe or tube 32ª which supplies pressure to the annular chamber 32 surrounding the packing ring 30 and with a tube 84 in communication with the port 72.

Locking mechanism.

In order to lock the filling head in its elevated position to cap the bottle after it has been filled, I provide a hydraulic lock, which comprises a cylinder 85 connected to the upper ends of the guide rods 20 by means of nuts 86. Slidably mounted within the cylinder 85 is a piston 87 having a piston rod 88 which extends downwardly through a stuffing box in the lower cylinder head and is connected to the cross bar 8, so that the piston will remain stationary at all times and the cylinder will be moved relative thereto by means of the guide rods 20. The cylinder casting is provided with a valve chamber 89 having a slide valve 90 therein, and which is held in its upper position by means of a spring 91. The top and bottom of the cylinder 85 are connected to the valve chamber by means of ports 92 and 93 respectively. This valve 90 is of the hollow type and is provided with ports 94 which permit the fluid such as oil to pass from the top of the piston to the bottom of the piston, or vice versa, when the valve is in the open position, shown in Figure 7. The valve 90 is provided with a stem 95 which extends upwardly through a cap 96 and a stuffing box therein, and which stem is arranged to be engaged by a lever 97 pivoted to the upper end of one of the rods 20, to move the valve to its open position. As the piston rod 88 in the structure shown in the main drawings merely extends through the lower cylinder head, it will readily be appreciated that the displacement will be greater in the upper portion of the cylinder than in the lower portion and in order to compensate for this I provide an oil cup 98 which is in communication with the valve chamber by means of ports in the head 96, so that when the piston is moved down relative to the cylinder, oil will flow from the cup into the cylinder, and when the piston is moved upwardly relative to the cylinder oil will flow from the cylinder back into the cup.

The lower face of the piston 87 is inclined to cause the air globules to collect at the peripheral portion. The cylinder 85 is cut away as at 85ª to form a space for the reception of air globules which may collect below the piston 87 at the periphery thereof. The lower face of the top cylinder head is also inclined toward the port 92. The air globules will be passed from the lower end of the cylinder by way of the cutaway portion 85ª to the upper portion thereof during the downward movement of the piston and from there they will pass out through the port 92.

In Figure 1 I have shown a modified arrangement in which the displacement is equal on both sides of the piston which can readily be accomplished by extending the piston rod through both heads, as clearly shown therein. In this construction I also provide an oil cup 98 connected with the cylinder to feed oil into the piston to compensate for any leakage.

Crown feeding mechanism.

99 is a crown or cap hopper connected to the cross bar 8, and rotatably mounted with this hopper is a crown feed wheel 100 which is arranged to feed caps to a flexible chute 101 and through which they are fed to the mechanism for feeding them into position with relation to the bottles. The feed wheel 100 is rotated by means of a pawl and ratchet mechanism 102 which is actuated by the filling head when moved upwardly by the bottle.

Connected to the filling head 18 is a table 103 to which the crowns are fed into the position shown in Figure 9. This table is provided with a bearing for a stud shaft 104 having a gear wheel 105 on one end thereof and a crown feeding lever 106 on the other end, which is arranged to be oscillated to feed one crown during each movement of the filling head. 107 is a hollow stem having a head 108 which is secured to the filling head 18. Slidably mounted on this stem 107 is a sleeve 109 which is provided with a rack 110 to oscillate the gear wheel 105 when the sleeve is reciprocated. The end of this sleeve 109 is provided with a flared mouth which is arranged to engage an annular seat 111 on the head 108 when the sleeve is in the position shown in Figure 9, to form an air-tight joint and prevent air from escaping from the head during the filling operation. The other end of this stem is provided with packing rings 112 to prevent air from escaping outwardly between the sleeve and the stem. This stem is provided with a slot 113 for the reception of the caps which are fed thereto by the arm 106, and 114 is a spring pressed friction pin arranged to retain the caps in position in the slot 113 to which they are fed by the arm 106 and prevent them from being displaced before they are actually moved into position by the proper mechanism. Slidably mounted within the opening in the stem 107 is a sleeve 115 and connected to the end of this sleeve is a head 116 to which the operating mechanism is connected. 117 is a cap feeding rod slidably mounted within the sleeve 115, and which is provided with a slot 118 for the reception of a pin 119 which is secured in the walls of the sleeve 115 to permit a certain amount of lost motion between said rod and the sleeve. Located within the sleeve and engaging one end of the rod 117 and the head 116 is a spring 120 which is arranged to move the rod 117 forward and feed a cap into the filling head at a predetermined time. Pivotally connected to a bracket 121 on the end of the sleeve 109 is a lever 122. One end of this lever is pivotally connected to a link 123 which is also connected to the head 116 on the end of the sleeve 115 while the other end of said lever is pivotally connected to one end of a rod 124 which is fixed against movement in the direction of a dotted arrow shown in Figure 9, by means of a projection 125 which engages a projection 126 on the table 103. 127 is a spring surrounding the one end of this rod 124 and which engages a head 128 on the end of the rod and the projection 126, and which is arranged to normally retain the rod in the position shown in Fig. 9.

This rod is provided in order to permit a crown to be ejected from the mechanism into the filling head without operating any of the other parts of the machine, so that a crown can readily be removed if desired.

Figure 4:
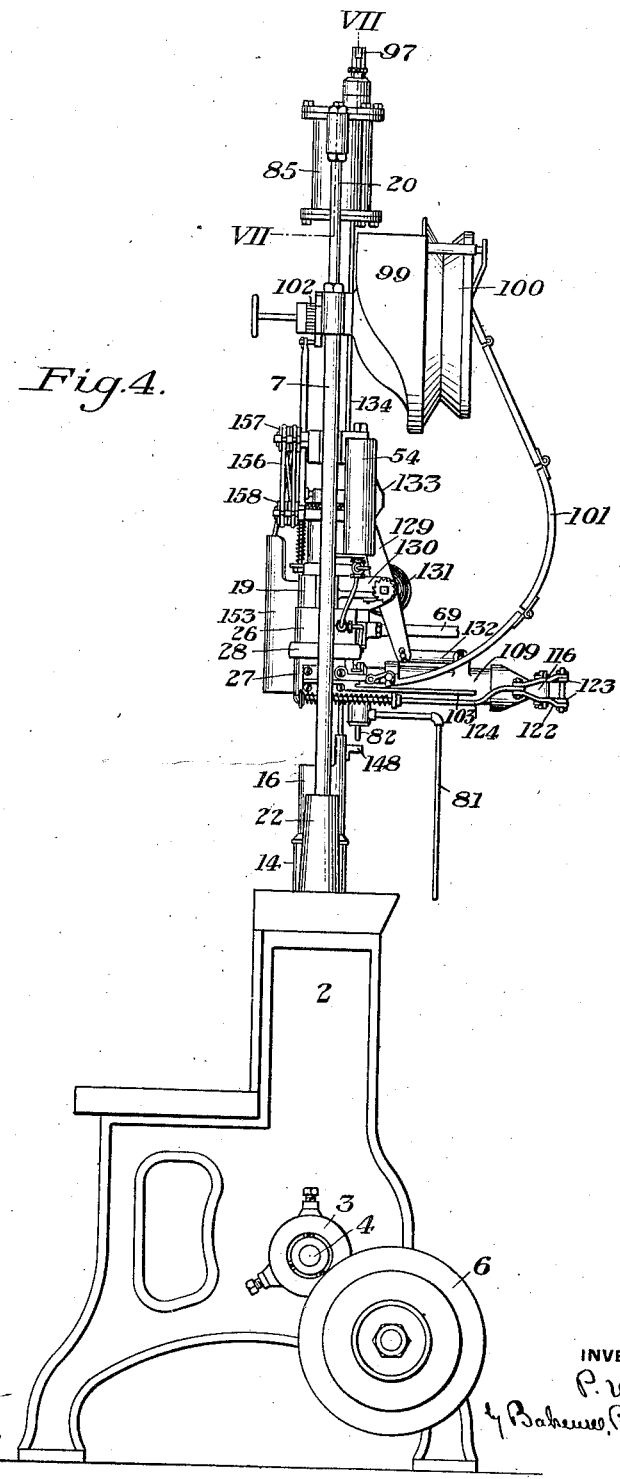
Figure 4 is an end view.
Figure 5:
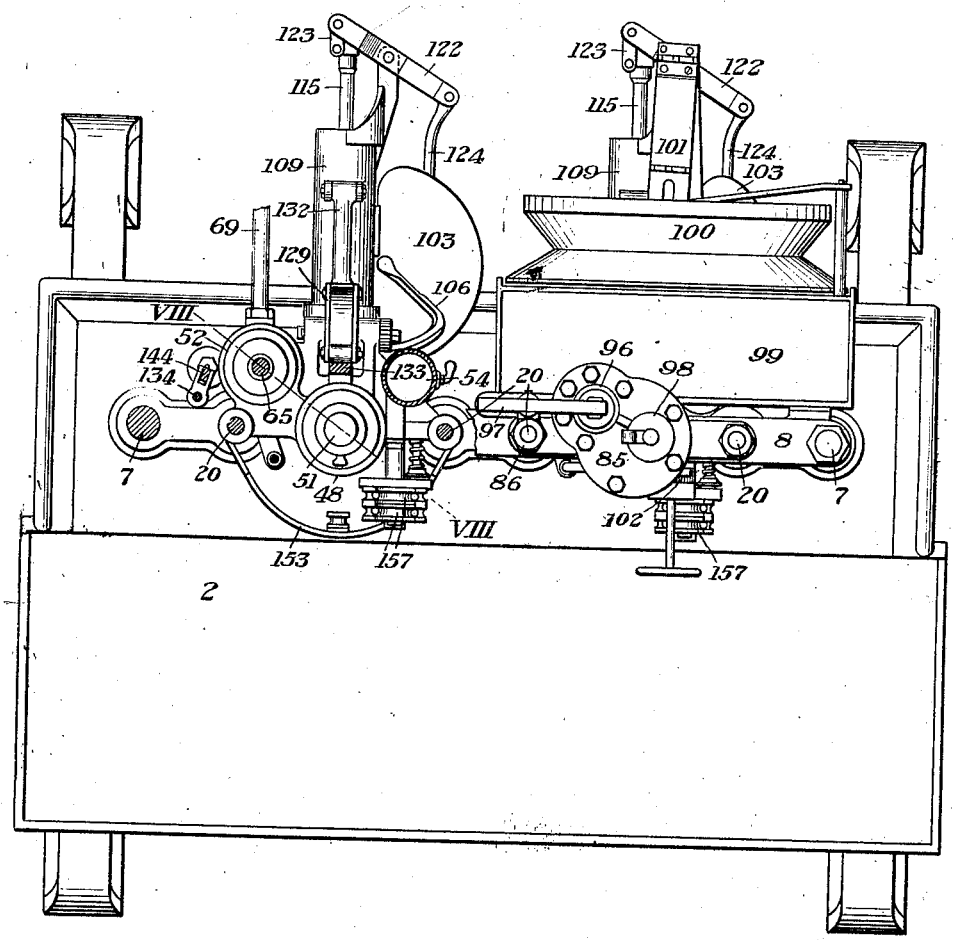
Figure 5 is a plan view partially in section.

129 is a walking beam which is pivotally connected at approximately its central portion to projections 130 on the cross head 19, and 131 is a coil spring for retaining the walking beam to the position shown in Figure 4. One end of this walking beam is connected by means of a link 132 with projections on the sleeve 109, while the other end thereof is arranged to be engaged by a cam 133 carried by the cross head 24.

The arrangement of the crown feeding mechanism is such that when the filling head is moved upwardly by means of a bottle, all of the capping mechanism carried by the cross head 19 and the filling head 18 will be moved upwardly relative to the cam 133 which will rock the walking beam and move the sleeve 109 to the closed position shown in Figure 9. This inward movement of the sleeve 109 will close the opening through which a cap was delivered to the slot 113, and during its forward movement will bring the plunger 117 into engagement with a cap and move the cap into engagement with the head of the bottle, and as the rod 117 cannot move its full stroke in view of the cap, the spring 120 will be compressed, but as soon as the bottle is moved downwardly after filling and just prior to the capping, the plunger 117 will move the cap into position over the bottle. During the downward movement of the filling head, as more particularly hereinafter described, the sleeve 109 will be moved outwardly to uncover the slot 113, and during this movement the rack 110 will rotate the gear wheel 105 to operate the lever 106 which will feed a crown into the slot 113 under the friction pin 114. As the sleeve 109 moves outwardly, the movement of the sleeve 115 will be compounded which will move the rod 117 a distance far greater than the movement of the sleeve 109. This is down in order to give the cap feeding rod 117 a movement far in excess of the movement of the sleeve.

*Valve operating mechanism.*

The valve operating mechanism comprises a sliding valve rod 134 pivotally connected to one end of a bell crank 135, and which rod is arranged to slide in a bearing in the frame 2 and the cross bar 8. The bell crank 135 is connected to a yoke 136 which is in turn connected to the guide rods 20 so as to move with the filling head. The other end of the bell crank 135 is pivotally connected to a collar 137 which engages a pin 138 on a collar 139, and which collar is fastened to a transverse slide rod 140. The connections between the bell crank and the pin 138 will permit the bell crank to be moved vertically with relation to the slide rod without affecting the connections between the slide rod and the bell crank. The slide rod 140 is slidably mounted in bearings 140× on the casing 17 for the cam 12. One end of the rod 140 is provided with a forked projection 141 which straddle a cam 142 connected to the shaft 4, the arrangement being such that when the rod 140 is shifted by the cam 142, the valve rod 134 will be raised or lowered to operate the valves as hereinafter described. This valve rod 134 extends upwardly to a point adjacent to the lever 97 for operating the lock valve 90, and the upper end of said rod is provided with an adjusting screw 143 which is arranged to be adjusted relative to the lever 97. Connected to the valve rod 134, adjacent to the filling head, is a pivoted lever 144 which is arranged to actuate the stem 74 of the water valve 73, when the filling head is moved upwardly. The upper end of this lever 144 is provided with a projection 145 which engages a projection 146 on the cross head 24 when the filling head is in its lowered position to hold the lower end of said lever out of alignment with the valve stem 74, and which is moved into alignment therewith by a spring 147 when the filling head has been moved a sufficient distance to permit the projections 145 and 146 to clear each other. The shiftable lever 144 is provided to prevent the opening of the water valve if the machine is running idly without a bottle therein, so that if the cam 142 lowers the rod 134 when there is no bottle in the machine the water valve 73 will not be actuated. This rod 134 is also provided with a tappet 148 for engaging the stem 82 of the valve 80 to exhaust the air from the air chamber in the cylinder 48 and also from the chamber surrounding the packing ring 30 to release the bottle after the crown has been applied.

*Cam oiling device.*

In order to properly lubricate the cam 12 I have enclosed it within a casing 17, which is provided with an upwardly extending pipe 149, and a downwardly extending pipe 150 which is connected to the lower end of the casing. This pipe 150 is in communication with a trap 151 having an upwardly extending pipe 152. This trap is arranged to be opened at the bottom to drain the casing when desired.

After the parts have been assembled a small amount of water is poured into the casing through the pipe 152, to raise the level of the water within the casing to the point X, as shown in Figure 6. The proper amount of oil is then poured into the casing through the pipe 149 which will float above the water. As before described a certain amount of leakage will take place between the members 10 and 14 and the sleeve 9 from the table 2, and which leakage is deposited into the casing, and will pass through the oil to the water below the oil, and as soon as the water below the oil reaches a predetermined level the weight of the oil will force some of the water out through the pipe 152, as the upper end thereof is slightly below the level of the oil, so that in this way, the leakage will be periodically forced out of the casing.

*Guard or shield mechanism.*

In order to protect the operator from being injured from broken glass from bottles which may be crushed under the filling operation, I provide a guard or shield 153 which is arranged to be lowered in front of the bottle by the upward movement of the filling head. This shield is provided with guides which slidably move in grooves in the sleeves 154 on the guide rods 20. Connected to this guard 154 is a sheave 155 around which passes a belt 156, which passes around two pulleys 157 journaled on a stud shaft connected to the cross head 24. This belt also passes around two pulleys 158 which are journaled on a stud shaft connected to the movable cross head 19.

The arrangement is such that when the filling head is moved upwardly, the pulley or sheave 158 will be moved toward the pulley 157 and permit the shield or guard 153 to move downwardly at twice the speed of the movement of the filling head, which would permit the guard to cover the bottle during the crowning operation.

Loosely mounted on the guide rods 20 between the cross head 24 and the cross head 19 are sleeves 159 which are arranged to be moved upwardly by the cross heads 19 during the upward movement of the filling head and raise the cross head 24 against the action of the springs 25 a short distance at the end of the upward movement of the bottle, and filling head, in order to maintain the bottle under pressure during the filling operation.

*Actuating cams and connections.*

The relative positions of the cams 12 and 142 are as shown in Figure 6, and in which the roller 11 is always on the line A, and the forked member 141 for actuating the slide rod 140 is on the line B which is approximately 18½° from the line A.

The actuating portions of the cam 12 are on the periphery thereof, while the actuating portions of the cam 142 are on the faces of the cam and reciprocate the rod 140 and which rod is moved at right angles to the valve rod 134.

In order to more clearly describe the operation I have arranged the cams 12 and 142 side by side in Figure 1, and at right angles to their normal positions. I have also somewhat modified the cam 142 together with the mechanism for actuating the valve rod 134, and in this figure the cam 142 is provided with a groove on one of its faces for actuating the bell crank 135 through the medium of the interposed mechanism. In this figure I have also shifted the center or line B 108½° from its position in Figure 6, so that the lines A and B in this figure are at an angle of 90° from each other.

In Figure 1 I have applied the same reference characters with the letter "a" affixed indicating the parts which perform the same functions as those shown in the other drawings, and in this figure the bell crank 135 is provided with a roller 137ª which engages a groove 138ª in a block 140ª. This block 140ª performs the same functions as the rod 140, and is arranged to slide in guides 140ᵇ. Connected to the block 140ª is a roller 141ª which performs the same function as the fork 141 and is arranged to be moved by the cam 142 to shift the block 140ª and thereby operate the bell crank 135.

Operation.

Assuming the parts to be as shown in Figure 1, and in which a bottle C has just been placed on the support 16, the rotation of the shaft 4 will cause the cams 12 and 142 to rotate in the direction indicated by the arrows. During the first part of the travel of these cams, the cam 12 will raise the bottle support to bring the bottle into engagement with the hollow stem 37 when the portion $a'$ of said cam reaches the roller 11, and during the travel of this cam from the point $a'$ to the point $a^2$, the bottle, together with the filling head, will be raised to the position shown in Figure 12. During this upward travel of the filling head the slotted pin 67 on the cross head 24 will engage the top of the stem 64 and force the syrup from the syrup pump through the check valve 68 into the port 60, and thence into the bottle. During this upward travel of the filling head, the guide rods 20 will be moved upwardly therewith, together with the yoke 136 which will elevate the valve operating rod 134 and the bell crank 135, and as the connections between the bell crank 135 and the rod 140 or block 140ª are such that their relations with the operating portions of the cam 142 is not changed, these parts will be positively operated by the cam 142. This elevating of the valve rod 134 will elevate the lever 144 with relation to the cross head 24 a sufficient distance to permit the projection 145 on the lever 144 to pass the projection 146 on the cross head 24 and permit the spring 147 to push the lever 144 into alignment with the stem 74 of the water valve. The upward movement of the guide rods 20 will also elevate the locking cylinder 85 with relation to its piston 87, the fluid passing from one side of the cylinder to the other side through the ports 92 and 93, as the valve 90 is open during this period of the operation. Just before the filling head 18 reaches its full upward position, the sleeves 159 on the guide rods 20 will move the cross head 24 upwardly against the action of the springs 25 to exert a spring pressure on the filling head and bottle C. This upward movement of the cross head 19 relative to the cross head 24 will also cause the one end of the walking beam 129 to ride on the high part of the cam 133, which cam is connected to the cross head 24, and will rock the walking bead 129 in the reverse position from that shown in Figure 4 to move the sleeve 109 over the hollow stem 107 into the position shown in Figure 9 of the drawings to seal the opening through which the cap is fed and to bring the cap into position with relation to the bottle being filled, as shown in Figure 12.

Immediately after the point $a^2$ of the cam 12 passes the roller 11, the point $b^1$ of cam 142 will engage the roller 141ª and during the movement of this cam from the point $b^1$ to the point $b^2$ the bell crank 135 will have shifted to move the rod 134 down a sufficient distance to permit the valves 79, 80 and 90 to close, to lock the filling head 18 with relation to the cross bar 8 and close the exhaust from the packing ring chamber 30 and the air chamber in the cylinder 48. During the further movement of this cam 142 from the point $b^2$ to the point $b^3$ the bell crank 135 will shift the rod a sufficient distance to cause the lever 144 to open the water valve 73. This opening of the water valve will permit the water to pass from the pressure supply through the pipe 71, port 72, check valve 75 into the port 60, and from where it passes into the bottle. This opening of the water valve 73 will also permit water to flow from the pressure supply through the pipe 32ª into the annular chamber 32 and press the packing ring 30 about the neck of the bottle to prevent the escape of the fluid between the bottle and the packing ring. The water in passing through the filling tube 40 will be given a swirly motion by the helical ribs 46 and which will cause a vortex through which the air will pass through the opening in the air escape tube 45 into the air chamber in the lower part of the cylinder 48. As soon as the air pressure in this cylinder is equal to the pressure of the water supply, the supply of water will be stopped, and as the piston 50 is arranged to be adjusted, the exact amount of water to be fed to the bottles can readily be regulated.

The filling of the bottle takes place during the travel of the cam 12 from the point $a^2$ to a point in advance of the point $a^3$. Just before the point $a^3$ of the cam 12 reaches the roller 11, the portions $b^4$ and $b^5$ of the cam 142 will raise the valve rod 134 a sufficient distance to permit the water valve 73 to close. During the travel of the cam 12 from the point $a^3$ to the point $a^4$, the roller 11 will be lowered, and the pressure within the filling head will be sufficient to force the bottle down away from the hollow stem 37 and below the crown which had engaged the neck of the bottle to a position shown in Figure 13. The spring 120 will then act to force the crown into position over the bottle through the medium of the cap feeding rod 117. The bottle, together with a crown thereon, will then be moved upwardly to the position shown in Figure 14, during the travel of the cam 12 from the point $a^4$ to a point slightly in advance of the point $a^5$ which will force the crown into the crowning die 38 and secure the crown to the top of the bottle. Just before the point $a^5$ of the cam 12 reaches the roller 11, the portions $b^6$, $b^7$ of the cam 142 will raise the valve rod 134 to open the valves 80 and 90. This opening of the valve 80 will exhaust the air from the air chamber in the cylinder 48, and the upward movement of the valve 80 will also open the valve 79 to exhaust the pressure from the annular chamber 32 to release the bottle. This opening of the valve 90 will permit the fluid to flow from the top of the cylinder to the bottom thereof and unlock the filling head with relation to the cross bar 8. Immediately after the point $a^5$ of the cam 12 passes the roller 11, the bottle, together with the filling head will be lowered and the parts will assume the positions shown in Figure 1 as soon as the part $a^6$ of the cam 11 reaches the roller 11 of the cam 12. During the downward travel of the head the walking beam 129 will be shifted to the positions shown in Figures 1 and 11 by the spring 131 to feed a cap into the hollow stem 107 and move the rod 117 against the action of its spring 120 to the position shown in Figure 11. When the cross head 19 reaches its lowermost positions the yoke 136 will rest on the extensions 21 of the cam casing 17, and during the further downward movement of the bottle support the water pressure in the chamber 33 in the filling head will force the piston 35 together with its stem 37 downwardly and force the bottle and crown out of the die 39.

During the downward movement of the filling head with relation to the cross head 24 the pin 67 will engage the head 66 of the rod 65 and move the piston 63 on the syrup pump relative to the cylinder thereof and draw in the proper amount of syrup for charging the next bottle.

The advantages of my invention result from the provision of a positively operated hydraulic lock for locking the filling head in position with relation to the bottle to permit the bottle to be lowered with relation to the filling head and feed in the crown after the bottle has been filled and to maintain the filling head in said position during the movement of the bottle when crowning. Furthermore, from the provision of valve operating mechanism carried by the filling head which is arranged to be moved by the bottle relative to the operating mechanism therefor, so that the valve actuating mechanism is always in timed relation to the other mechanism regardless of the height of the bottle. By this arrangement the valve mechanism need not be adjusted for varying heights of bottles. Furthermore, from the provision of mechanism which is so arranged that the filling head and all of its associated parts remain inactive when the driving shaft is rotated unless a bottle is placed in position on the support.

I claim:

1. In a machine for filling bottles, a filling head, a bottle support, means for moving the filling head by the bottle, means for filling the bottle after the head has been moved, a lock arranged to lock the filling head in the position shifted by the bottle, said first mentioned means being operative for lowering the bottle support with relation to the filling head after it has been locked, for feeding a crown to the bottle after it has been lowered, and for raising the bottle to secure the crown on the bottle within the filling head, substantially as described.

2. In a machine for filling bottles, a filling head having a bottle-receiving opening, a bottle support, means for moving the filling head and the bottle support relative to each other, a lock for locking one of said members against movement, means for filling the bottle, said first mentioned means being operative for moving the head and bottle relative to each other after the bottle has been filled, the lock retaining the other member in its fixed position, such first mentioned means feeding the crown into the filling head above the bottle, and moving the movable member relative to the other member to force the crown onto the bottle, substantially as described.

3. In a machine for filling bottles, a filling head having a bottle receiving opening, a bottle support, means for moving the bottle support together with a bottle to move the bottle into the filling head and to then move the filling head, a supporting frame, a lock comprising a piston member and a cylinder member, one of said members being carried by the frame while the other member is carried by the filling head, so that one element is moved relative to the other member, a locking fluid in said cylinder, there being ports to permit the fluid to flow from one side of the piston to the other side of the piston in the cylinder when the cylinder is moved relative to the piston, a valve for controlling said ports, means for actuating the valve to open it when the piston is moved relative to the cylinder and to close it when one of said members has been moved to a predetermined position by the bottle, means for filling the bottle through the head, said first mentioned means lowering the bottle with relation to the head after it has been filled, feeding a crown into the filling head after the bottle has been lowered, and elevating the bottle to force the crown into position on the bottle, substantially as described.

4. In a machine for filling and crowning bottles, a filling head, crown feeding mechanism, a bottle support, means for moving the bottle and support relative to the filling head and to then move the filling head, and a hydraulic lock for locking the filling head in its shifted position, substantially as described.

5. In a machine for filling and crowning bottles, a filling head for receiving a bottle, a bottle support, means for moving the bottle support and bottle relative to the filling head and to then move the filling head by the bottle, a hydraulic lock for locking the filling head in its shifted position, a valve for controlling the flow of fluid in said hydraulic lock, and means for closing the valve to lock the filling head in its shifted position after it has been moved to a predetermined point by the bottle, substantially as described.

6. In a machine for filling bottles, a frame, a filling head movably mounted on said frame, a bottle support movably mounted in said frame, a cam for moving the bottle support together with the bottle, the filling head being arranged to be moved by the bottle, filling mechanism arranged to fill the bottle after the filling head has been moved, a spring pressure device carried by the frame, and arranged to be shifted by the filling head after it has been moved a predetermined distance, a lock for locking the filling head and pressure device in their shifted positions, said cam lowering the bottle after it has been filled, and crown feeding mechanism for feeding a crown to the bottle after it has been lowered, said cam elevating the bottle against the spring pressure device to force the crown into position on the bottle, substantially as described.

7. In a machine for filling bottles, a frame, a movable filling head mounted on the frame and having a bottle receiving opening therein, a tubular guide on the frame, a bottle elevating plunger slidably mounted in the guide and arranged to support a bottle, said elevating plunger having upper and lower members within the guide arranged to be adjusted relative to each other for varying the length thereof, a removable bottle support carried by the upper member of said plunger, means to move the bottle support together with the bottle into filling relation with the filling head and to then move the filling head by means of the bottle, and means for filling the bottle after it has moved the head to a position determined by the length of the bottle, substantially as described.

8. In a machine for filling and crowning bottles, a filling and crowning head, automatic crown feeding mechanism for said head, a bottle support, and means for moving the bottle and support relative to the filling and crowning head and then moving the filling and crowning head by the bottle, substantially as described.

9. In a machine for filling bottles, a supporting frame, a filling head movably mounted on said frame, a bottle support movably mounted in said frame, means for moving said support together with the bottle into operative relation on with the filling head and to then move the filling head and the bottle support together with relation to the frame, filling mechanism including valves for admitting fluid to said bottle, valve actuating mechanism carried with the filling head, and means for operating said valve actuating mechanism after the filling head has been moved to a position determined by the length of the bottle, substantially as described.

10. In a machine for filling bottles, a supporting frame, a filling head movably mounted on the frame, there being a bottle receiving opening in said head, a bottle support movably mounted in the frame below the head, a cam shaft, a cam carried by said shaft and arranged to move the bottle support to move the bottle into filling relation with the head and to then move the filling head in relation to the frame, a hydraulic lock for locking the filling head in relation to the frame after the filling head has been moved a distance determined by the length of the bottle, valve mechanism for controlling the flow of fluid in the hydraulic lock carried by the filling head, a valve for controlling the admission of water to the bottle after the filling head has been moved a distance determined by the length of the bottle, said valve being carried by the filling head, a valve rod carried by the filling head having means thereon for closing the hydraulic lock valve and opening the water valve, a second cam on the cam shaft arranged to shift the valve rod after the filling head has been moved said determined distance to close the valve of the hydraulic lock and open the water valve a slip connection between the cam and the valve rod to permit the valve rod to be moved relative to the cam without affecting the connections between the cam and said rod, means on the first cam for permitting the bottle support and bottle to be lowered with relation to the filling head after the bottle has been filled, crown feeding mechanism for feeding a crown into the filling head after the bottle has been lowered, the first cam also having means for again elevating the bottle support together with the bottle to force the crown onto the bottle, means on the second cam for actuating the valve rod to close the water valve before the bottle is lowered, other means on the valve cam for shifting the rod to actuate the lock valve to release the filling head, and means on the first cam for permitting the crowned bottle together with the filling head to move downwardly to their initial positions, substantially as described.

11. In a machine for filling and crowning bottles, a movable filling and crowning head, a movable bottle supporting member, means for moving the bottle supporting member relative to the head to bring the bottle and head into filling relation, a hydraulic lock for locking the filling head in filling and crowning relation to the bottle, means for actuating said lock to lock the head in crowning relation to the bottle, means for filling the bottle after it has been locked, said first mentioned means lowering the bottle with relation to the head after it has been filled, and means for feeding a crown into the head after the bottle has been lowered, said first mentioned means then operating to move the head and bottle relative to each other to apply the crown to the bottle, substantially as described.

12. In a machine for filling and crowning bottles, a movable filling and crowning head, a movable bottle supporting member, means for moving the bottle supporting member relative to the head to bring the bottle and head into filling relation, a hydraulic lock for locking the filling head in filling and crowning relation to the bottle, means for actuating said lock to lock the head in crowning relation to the bottle before filling, means for filling the bottle when in filling relation, said first mentioned means lowering the bottle with relation to the head after it has been filled, means for feeding a crown into the head after the bottle has been lowered, said first mentioned means operating to move the head and bottle relative to each other to apply the crown to the bottle, and means to unlock the head after the crown has been applied, substantially as described.

13. In a machine for filling and crowning bottles, a movable filling and crowning head, a movable bottle supporting member, means for moving the bottle supporting member relative to the head to bring the bottle and head into filling relation, a movable cylinder carried by the head, a stationary piston within said cylinder, fluid within said cylinder, there being ports to permit the fluid to pass from one side of the piston to the other side of the piston, a valve for controlling the flow of fluid through said ports, means for actuating the valve to stop the flow of fluid from one side of the piston to the other when the filling head is in operative position, with relation to the bottle to lock the filling head, said first mentioned means filling the bottle, means for lowering the bottle after it has been filled, means for feeding a crown into the head after it has been lowered, said first mentioned means operating to move the bottle with relation to the head to apply the crown, and then lower the bottle after it has been crowned, together with means for actuating the valve to permit the locking cylinder to move relative to the piston to lower the head, substantially as described.

14. In a machine for filling bottles, a movable bottle support, means for moving the support and bottle thereon, a movable filling and crowning head arranged to be moved by the bottle, filling mechanism carried by the head, crown feeding and applying means carried by the head, a lock for locking the head in crowning relation to the bottle, means for actuating the filling mechanism after the bottle has been moved into filling relation with the head, said first mentioned means lowering the bottle after it has been filled, and means for actuating the crown feeding means after the bottle has been lowered, said first mentioned means raising the bottle and the crown with relation to the head to apply the crown, substantially as described.

15. In a machine for filling and crowning bottles, a filling and crowning head arranged to be moved relative to the bottle to be filled, a bottle engaging member in the head, means for maintaining the engaging member under pressure, a filling tube extending through the engaging member and normally extending beyond said member, crown feeding mechanism for feeding a crown into the filling head between the filling tube and the bottle, and means for continuously applying pressure to the filling tube to hold it in its downward position, the lower end of said tube being arranged to engage the crown to seat it on the bottle when the crown is fed between the bottle and the tube, substantially as described.

16. In a machine for filling and crowning bottles, a filling and crowning head arranged to be moved by the bottle to be filled, a bottle engaging member in the head, means for maintaining the engaging member under pressure, a filling tube extending through the engaging member and normally extending beyond said member, crown feeding mechanism for feeding a crown into the filling head between the filling tube and the bottle, and spring means for continuously applying pressure to the filling tube, the arrangement being such that when the crown is fed into position between the tube and the bottle, the crown will be forced to its seat on the bottle by the filling tube, substantially as described.

17. In a machine for filling and crowning bottles, a movable filling and crowning head, a hydraulic lock having a movable member carried by the head, a stationary member, a valve for controlling the flow of fluid in said lock, means for moving the valve to lock and unlock the head, and means for compensating for the fluid displaced by the relative movement of said members, substantially as described.

18. In a machine for filling and crowning a bottle, a supporting frame, a movable filling and crowning head, a hydraulic lock for the head comprising a cylinder carried by the head, a piston connected to the frame, a valve for controlling the flow of fluid in said lock, means for moving the valve to lock and unlock the head, and means for compensating for the fluid displaced by the movement of the piston into the cylinder, substantially as described.

19. In a cap or crown feeding device for a bottling machine, a filling head, a hollow stem for the reception of the crown, a crown feeding device for successively feeding crowns thereto, a sleeve mounted on the stem and arranged to seal the opening through which the crowns are fed, means for reciprocating the sleeve, a crown feeding rod movably mounted in the stem, a lever connected to the rod and sleeve, a spring for moving the rod to force the crown into the filling head, and actuating connections between the sleeve and crown feeding device, substantially as described.

20. A filling and crowning head having a filling tube arranged to enter the mouth of the bottle, an air escape tube within the filling tube, a spiral member connected to the air escape tube between the inner wall of the filling tube and the air escape tube, and yielding means for holding the filling tube and air escape tube in their lowermost position, substantially as described.

21. In a machine for filling and crowning bottles, a movable member, a hydraulic lock having a closed connection, a valve in said connection, means for closing said valve after the movable member has been moved to its determined position, and means for automatically maintaining said lock filled with fluid, substantially as described.

22. In a machine for filling and crowning bottles, a movable filling and crowning device, a piston member and cylinder member, one of said members being connected to the movable filling device, a closed connection between the ends of the cylinder, a valve in said connection arranged to be opened to establish communication between the opposite ends of the cylinder and means for closing said valve when the movable filling member has been moved to its determined position, said cylinder being adapted to contain fluid for preventing relative movement in either direction between said piston and cylinder when the valve is closed, substantially as described.

23. In a machine for filling and crowning bottles, a filling and crowning head, automatic crown feeding mechanism for said head, a bottle support, means for moving the bottle and support relative to the filling and crowning head and then moving the filling and crowning head by the bottle, and means for locking the filling and crowning head in the position to which it is moved by the bottle, substantially as described.

24. In a machine for filling and crowning bottles, a filling and crowning head, automatic crown feeding mechanism for said head, a bottle support, means for moving the bottle and support relative to the filling and crowning head and then moving the filling and crowning head by the bottle, and means for locking the filling and crowning head in the position to which it is moved by the bottle, said last mentioned means preventing undesired movement of the head in either direction, substantially as described.

25. In a machine for filling and crowning bottles, a filling and crowning head, means for producing a relative movement between the filling and crowning head, and the bottle to be filled and crowned, and means for positively locking said head in the exact crowning position determined by the length of the bottle, said means preventing movement of the locked head in either direction, substantially as described.

26. In a machine for filling and crowning bottles, a filling and crowning head adapted to be moved to crowning position by the bottle to be crowned, and means for positively locking said head in the exact position to which it is moved by the bottle, said means preventing movement of the locked head in either direction, substantially as described.

27. In a machine for filling and crowning bottles, a filling and crowning head adapted to be moved to crowning position by the bottle to be crowned, and hydraulic means for positively locking said head in the exact position to which it is moved by the bottle, said means preventing movement of the locked head in either direction, substantially as described.

28. In a machine for filling and crowning bottles, a filling and crowning head adapted to be moved to crowning position by the bottle to be crowned, and a cylinder containing a non-compressible fluid for positively locking said head in the exact position to which it is moved by the bottle, said means preventing movement of the locked head in either direction, substantially as described.

29. In a machine for filling and crowning bottles, a filling and crowning member, a bottle supporting member, and hydraulic means for positively locking one of said members in exact crowning position determined by the length of the bottle, said means preventing movement of the locked member in either direction, substantially as described.

30. In a machine for filling and crowning bottles, a filling and crowning member, a bottle supporting member adapted to move said filling and crowning members to crowning position, and means for positively locking one of said members in exact position for the crowning operation as determined by the length of the bottle, said means preventing movement of the locked member in either direction, substantially as described.

31. In a machine for filling and crowning bottles, a filling and crowning head, crown feeding mechanism, a bottle support, means for moving the support and bottle relatively to the filling and crowning head, and then elevating the crowning and filling head by the bottle, and a filling tube within the filling and crowning head, said filling tube being effective for centering the crown fed by said mechanism, substantially as described.

32. In a bottle filling and crowning machine, a filling and crowning head, yielding means retarding the upward movement of said head, a bottle support, means for lifting said bottle support, said support and bottle being adapted to move relatively to said head and then engage and lift the head, means for locking said head in the position to which it is lifted by the bottle, means for feeding crowns to said head, and a filling tube in said head effective for centering the crowns fed thereto, substantially as described.

33. In a bottle filling and crowning machine, a filling head, yielding means retarding the upward movement of the filling head, a bottle support, means for lifting said bottle support, said support and bottle being adapted to move relatively to the filling head and then engage and lift the filling head, and means for locking said head in the position to which it is lifted by the bottle, substantially as described.

34. In a machine for filling and crowning bottles, a filling and crowning head, crown feeding mechanism for said head, a bottle support, means for moving the support and bottle relatively to the head and then elevating the head by the bottle, means for locking the head in elevated position, and a filling tube within the head effective for centering the crowns fed thereto by said mechanism, substantially as described.

35. In a machine for filling and crowning bottles, a filling and crowning head, means for producing relative movement between the filling and crowning head and the bottle to be filled and crowned, and means for positively locking said head against movement in either direction when in the exact crowning position determined by the length of the bottle, substantially as described.

36. In a machine for filling and crowning bottles, a filling and crowning head adapted to be moved to crowning position by the bottle to be crowned, and means for positively locking said head against movement in either direction when in the exact position to which it is moved by the bottle, substantially as described.

37. In a machine for filling and crowning bottles, a filling and crowning head, hydraulic means for positively locking said head against movement in either direction when in the exact crowning position determined by the length of the bottle, and means permitting the escape of vapors from said locking means, substantially as described.

38. In a machine for filling and crowning bottles, a filling and crowning head adapted to be moved to crowning position by the bottle to be crowned, hydraulic means for positively locking said head against movement in either direction when in the exact position to which it is moved by the bottle, and means permitting the escape of vapors from said locking means, substantially as described.

39. In a machine for crowning bottles, a crowning head, hydraulic means for positively locking said head aaginst movement in either direction when in the desired crowning position, said means comprising a fluid filled cylinder having a piston therein, and means for maintaining a sufficient supply of fluid within said cylinder to completely fill the same with the piston in any position, substantially as described.

40. In a machine for crowning bottles, a crowning head, hydraulic means for positively locking said head against movement in either direction when in the desired crowning position, said means comprising a fluid filled cylinder having a piston therein, means for maintaining a sufficient supply of fluid within said cylinder to completely fill the same with the piston in any position, and means permitting the escape of vapors from said cylinder, substantially as described.

In testimony whereof, I have hereunto set my hand.

P. W. SHIELDS.